United States Patent Office
2,702,824
Patented Feb. 22, 1955

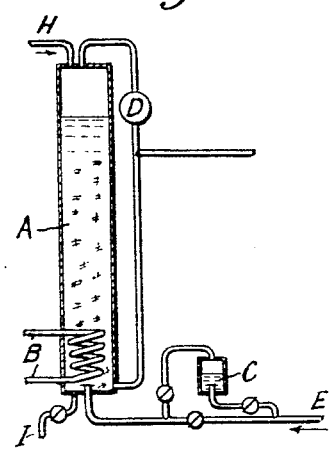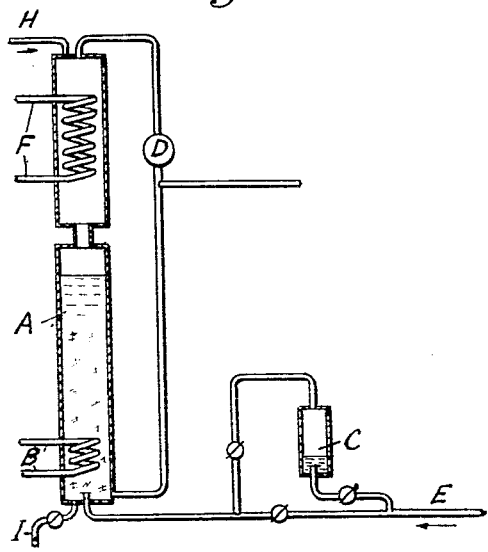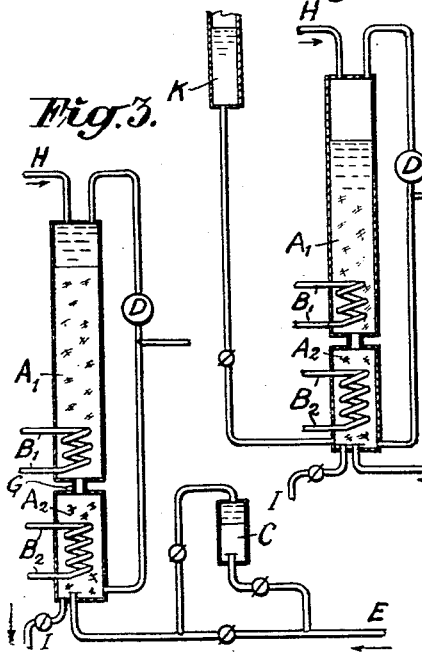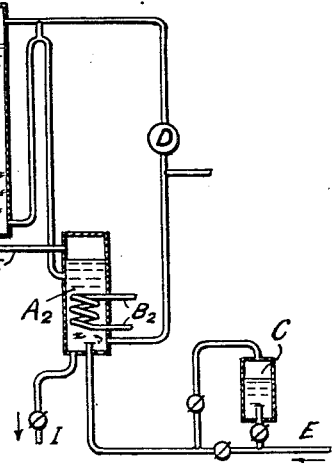

2,702,824

LIQUID-VAPOR PHASE METHOD FOR PRODUCING LOWER DIALKYL SULFOXIDES

Gustav Allan Wetterholm and Kåre Ragnvald Fossan, Gyttorp, Sweden, assignors to Nitroglycerin Aktiebolaget, Gyttorp, Sweden, a company Application August 18, 1952, Serial No. 305,044

6 Claims. (Cl. 260—607)

The present invention relates to a method for producing low-molecular dialkyl sulfoxides which is characterized therein that the corresponding dialkyl sulfides are oxidized in the liquid phase by means of an oxygen or a gas mixture containing oxygen under catalysis of nitric oxides which here include NO, $NO_2$, $N_2O_3$, $N_2O_4$ and $HNO_3$ of at least 99% concentration.

It is known to produce dimethyl sulfoxide by oxidizing dimethyl sulfide in the gaseous phase with oxygen or air while employing nitric oxide and/or other oxygen-transmitting nitric oxides as catalysts. In this process the dimethyl sulfide must be converted into the gaseous form prior to oxidation which does not involve any difficulties in itself owing to the volatility of the sulfide, but the carrying out of the process on a commercial scale is rendered difficult on account of the large volumes that have to be handled. Moreover, if in said process a surplus of oxidizing gas is employed, $N_2O_4$-losses will occur during condensation, owing to the solubility of this substance in the methyl sulfide-methyl sulfoxide mixture. If on the other hand the process is carried out with a deficit of oxidizing gas in which case the nitric oxide is present as NO, which is not appreciably soluble in said reaction mixture, losses of sulfide will occur, if the gases are not recirculated which is possible with pure oxygen but scarcely so with air.

Experiments have now shown surprisingly enough that the oxidizing process takes place so easily that it can even be carried out in the liquid phase in the manner indicated, and this applies not only to dimethyl sulfide but also to other low-molecular dialkyl sulfides. It is thus possible to carry out oxidation by introducing oxygen or air, for example, into the liquid dialkyl sulfide together with one or more of the said catalysts, which may be mixed with the oxidizing gases or added to the liquid separately. A condition for carrying out the process is, of course, that the rate of adding the oxidizing gases and the reaction path, the concentration of the catalysts and the temperature must be in suitable relation to the rate of oxidation, under which assumption the oxygen is entirely consumed during the passage through the liquid and the oxidation of the dialkyl sulfide takes place exclusively in the liquid phase. Under these conditions the gas bubbles which pass through the liquid consist of nitric oxide and—when air is used—also of nitrogen, etc., but not of any higher nitric oxides, and the capacity of these gases to oxidize dialkyl sulfide to the corresponding sulfoxide is entirely exhausted.

The method is preferably carried out in a closed system with circulation and re-introduction into the process, either entirely or partly, of the escaping gases which may also contain vaporized dialkyl sulfide.

As indicated above, instead of adding nitric oxides as such, nitric acid of at least 99% concentration may also be added primarily as a catalyst. In this connection it is preferable to proceed in such a way that a few per cent of the acid are added in the beginning and the reaction zone is heated up to a temperature above 30° C., whereby the nitric oxides necessary for the catalysts are visibly formed directly in the liquid. If on the other hand, $NO_2$, $N_2O_3$ or similar nitric oxides are added as such it is not necessary to heat the liquid and the reaction can commence at room temperature (20–25° C.) in which case the temperature of the reaction mixture will subsequently rise to 35° C. or higher, according to the dialkyl sulfide being treated, whereupon cooling may take place, if necessary. As the reaction progresses, the nitric oxide passing off must be replaced which may be effected by the re-introduction of nitric oxide into the process as described above, or by the addition of fresh nitric oxide or nitric acid. The concentration of the catalysts is successively increased to enable the reaction to continue until it is completed, so that the whole quantity of the dialkyl sulfide is converted to dialkyl sulfoxide. During the latter part of the process the temperature may also suitably be raised slightly but should always be kept below the boiling point of the reaction mixture.

The process may either be carried out interruptedly or continuously, that is, under continual addition of both dialkyl sulfide and oxidizing gas and continual removal of the dialkyl sulfoxide formed.

The process is preferably carried out in a reaction column which may suitably be filled with filling material, such as Rasching rings or the like, containing dialkyl sulfide in liquid form into which the gases are introduced at the bottom of the column which is provided with suitable pipe coils conveying a heating or cooling medium for regulating the temperature, arrangements also being made for the circulation of the gases. In a reaction column of this kind the reaction conditions can be conveniently regulated and controlled in the manner described. Thus, incomplete oxidation in the solution which may produce oxidation in the gaseous phase secondarily, is recognised in the following manner:

The gaseous phase is heated.

Condensation of the sulfoxide takes place and may be observed in the unfilled part of the column above the surface of the liquid.

As the atmosphere above the surface of the liquid is normally filled with NO and dialkyl sulfide, an oxygen bubble, should one pass through the solution unconsumed, will momentarily colour the layer above the surface brown owing to the formation of $NO_2$ which will then react with dialkyl sulfide under discolouration.

The process according to the invention is more particularly described below with reference to the accompanying drawing which in Figs. 1–5 illustrates various forms of construction of suitable apparatus for carrying out the process.

In all the figures A is the reaction column which may be provided with a filling material as indicated in the drawing, or without such material, B indicates the pipe-coils for the heating- or cooling medium, D is the circulating pump, E is the piping for supplying the oxidizing gases, H is the supply pipe for dialkyl sulfide and I is the piping for drawing off the dialkyl sulfoxide. In Figs. 1–4 the piping E is combined by a shunt connection with a vessel C for supplying the catalysing gases, while Fig. 5 shows an arrangement for supplying nitric acid as the catalysing agent, from the vessel K.

In the arrangement according to Fig. 1 it is assumed that oxidation will take place with a supply of oxygen gas as the oxidizing agent. The oxygen is partially saturated in the vessel C by the catalysing gas. The pipe coil for regulating the temperature is located in the lower part of the zone of the main reaction, and the gas flowing out which consists chiefly of NO, is circulated and forced into the system again.

In the arrangement according to Fig. 2 it is assumed that oxidation will be effected by a gas mixture such as air which is supplied saturated with catalysing gases in the same manner as in Fig. 1. Here, however, an effective cooler F is required to reduce the quantities of dialkyl sulfide carried along by the gases passing off which in addition to NO contain large quantities of nitrogen. For drawing off a part of the quantities of gas passing off, the circulating piping is here provided with a draw-off pipe, as indicated in the drawing.

In the forms of construction shown in Figs. 3 and 4 it is assumed that the process is carried on continuously. The reaction zone is here divided into two sections, namely, the primary zone $A_1$ and the secondary zone $A_2$, which are connected to one another by a throttle passage G, as may be seen in Fig. 3. In this case the main reaction takes place in the primary zone A₁, with the heating-cooling coil B₁, while the last part of the oxidation is carried out with fresh gas under heating by means of the coil B₂ in the secondary reaction zone. The dialkyl sulfide is supplied continuously at H.

The arrangement according to Fig. 4 is based on the same principle as the arrangement shown in Fig. 3, but has a slightly varied form for the separation of the two reaction zones. Finally, as stated above, the arrangement according to Fig. 5 is intended for supplying nitric acid as a catalysing agent, but is similar in all other essential respects to the arrangement according to Fig. 3.

Instead of dividing the reaction zone into two sections as shown in Figs. 3–5, it is also possible to employ more than two reaction zones, if desired.

*Example 1*

Into a column 13 cm. long and 4.5 in diameter provided with a gas inlet pipe at the bottom and a gas distributing plate, 800 g. of dimethyl sulfide were introduced. The lower half of the tube was filled with a filling material to increase the reaction surface. The upper part of the column was provided with a good cooler cooled by means of a cooling liquid of —10° C. From the beginning so much $NO_2$ was supplied to the solution that its concentration became ½%. Initial temperature 20–25° C. In this case the oxidizing mixture consisted of oxygen containing 12–15% $NO_2$. The $NO_2$ concentration was regulated from time to time so that complete absorption of the oxygen was effected. Rate of oxygen 6–10 liter per hour. Higher gas velocities may also be adopted if desired. With higher temperatures a lower $NO_2$ concentration may be employed without unconsumed oxygen passing through the liquid. As the reaction progressed the temperature was raised slightly, up to 40–45° C. final temperature. The yield of dimethyl sulfoxide was 95% of the theoretical value.

*Example 2*

Into a column approximately 15 cm. long with a 3-necked ½ lt. retort at the bottom and a gas supply pipe inserted into one of the necks of the retort passing through it, and provided with a gas distributing plate, 884 g. of dimethyl sulfide were introduced. The upper part of the pipe was provided with a good cooler. One of the remaining necks of the retort was employed as a supply pipe for highly concentrated (at least 99%) nitric acid. It is advantageous to use fuming nitric acid containing $NO_2$. Through the third neck a thermometer was inserted and samples could be drawn off by means of a T-pipe and cock.

At the beginning of the experiment so much nitric acid was added that a 1% total concentration was obtained. At the same time the solution was heated to 35° C. and the introduction of oxygen was begun at a rate of 8–9 liter per hour (11.2–12.6 g.). Every second hour 5 g. of concentrated acid were added to replace the loss of nitric oxide and accelerate the reaction. As the experiment progressed, the temperature was also raised slightly to finally reach about 50° C. in the reaction zone. The temperature was considerably lower in the upper part of the column. The introduction of oxygen was continued for 20 hours after which oxidation was found to be complete. Tests by mixing with water then exhibited complete miscibility. The total content of nitrogen compounds towards the end corresponded to 1.59% nitrogen. Yield of dimethyl sulfoxide 4087 g. or 90% when the nitrogen is calculated as nitric acid and the total weight is corrected accordingly.

*Example 3*

In an apparatus consisting of a glass tube 30 cm. long and 3 cm. in diameter, a cooler, thermometer and a gas distributor, 200 g. of diethyl sulfide were introduced. A mixture of oxygen and $NO_2$ was then led into the apparatus, the composition of the mixture being so regulated that the oxygen was entirely consumed during its passage through the diethyl sulfide. Hereby the content of NO varied between 5 and 15%. Owing to the low solubility of the nitric oxide in the reaction mixture, a part of the catalysts was lost so that a certain quantity of $NO_2$ had to be added throughout the whole of the experiment.

Oxidation took place very readily and under considerable development of heat, but the reaction temperature was maintained at 40–50° C., when necessary by external cooling with water.

After the greater part of the diethyl sulfide had been converted to diethyl sulfoxide the mixture was neutralised with gaseous ammonia. On distillation in vacuum (15 mm.) the diethyl sulfoxide passed over at 92° C. Melting point 17° C.

In an analogous manner dipropyl sulfoxide, melting point 21° C. (somewhat undefinite), dibutyl sulfoxide, melting point 30° C., and ethylpropyl sulfoxide, melting point 19° C., were produced.

It will be noted from the above specific examples that the oxygen-containing gas used in our process is initially passed through a body of liquid consisting of liquid dialkyl sulfide. No extraneous solvent is added and, even when 1% of 99% nitric acid is added, as in Example 2, no more than a trace of water is present in the reaction zone.

We claim:

1. In the manufacture of low-molecular dialkyl sulfoxides, the process which comprises establishing and maintaining in a reaction zone a body of liquid which at the start of the process consists of a liquid low-molecular dialkyl sulfide; this liquid dialkyl sulfide being converted into liquid dialkyl sulfoxide during the course of the reaction; introducing a small amount, sufficient only to catalyze the oxidizing reaction, of a catalyst, selected from the group consisting of NO, $NO_2$, $N_2O_3$, $N_2O_4$ and $HNO_3$ of at least 99% concentration, maintaining the liquid reaction mixture at a temperature below the boiling point of the liquid reaction mixture while passing therethrough an oxygen-containing gas at a rate below that causing discoloration of the vapor above the reaction liquid, whereby the oxidation of the dialkyl sulfide takes place exclusively in the reaction liquid, and recovering the resulting dialkyl sulfoxide.

2. The process of claim 1 wherein the dialkyl sulfide is dimethyl sulfide.

3. The process of claim 1 wherein the process is conducted in two reaction zones, one being positioned above the other, the liquid dialkyl sulfide being passed into the upper reaction zone and the dialkyl sulfoxide being drawn off from the bottom of the lower reaction zone.

4. The process of claim 1 wherein at least part of the gases escaping from the body of liquid dialkyl sulfide is recycled and re-introduced into the process.

5. The process of claim 1 wherein highly concentrated nitric acid of at least 99% concentration is the catalyst, a few per cent of this acid being introduced into the body of liquid dialkyl sulfide at the start of the process, the body of liquid being heated to a temperature above 30° C. to start the reaction and cause the formation of nitrogen oxides in the liquid.

6. The process of claim 1 wherein the catalyst is a nitrogen oxide higher than NO and the reaction zone is at room temperature at the start of the process.

References Cited in the file of this patent

UNITED STATES PATENTS 2,581,050    Smedslund _____ Jan. 1, 1952

FOREIGN PATENTS 442,524    Great Britain _____ Feb. 10, 1936